United States Patent [19]

Dennison

[11] 4,274,096
[45] Jun. 16, 1981

[54] AIRCRAFT PROXIMITY MONITORING SYSTEM

[76] Inventor: Terry A. Dennison, 1133 Elizabeth, Naperville, Ill. 60540

[21] Appl. No.: 55,992

[22] Filed: Jul. 9, 1979

[51] Int. Cl.³ .............................................. G01S 3/02
[52] U.S. Cl. ........................ 343/112 TC; 343/112 CA
[58] Field of Search ................. 343/112 CA, 112 TC, 343/112 C; 340/24, 26

[56] References Cited

U.S. PATENT DOCUMENTS

| 3,298,022 | 1/1967 | Smith | 343/112 CA |
| 3,717,873 | 2/1973 | Riggs | 343/112 CA |
| 3,808,598 | 4/1974 | Carter | 343/112 TC |

*Primary Examiner*—Theodore M. Blum

*Attorney, Agent, or Firm*—Trexler, Wolters, Bushnell & Fosse, Ltd.

[57] ABSTRACT

An aircraft proximity monitoring method according to the invention comprises the steps of: continuously and repeatedly developing and transmitting signals corresponding to the positions relative to a first location of aircraft within a predetermined range of said first location receiving said transmitted signals at a given aircraft and transposing the signals corresponding to the positions of the others of said aircraft to said second signals corresponding to the positions of said other aircraft relative to the location of said given aircraft and producing an observable indication of the positions of said other aircraft relative to said location of said given aircraft. Apparatus according to the invention includes apparatus for performing each of the foregoing steps.

19 Claims, 4 Drawing Figures

AIRCRAFT PROXIMITY MONITORING SYSTEM

BACKGROUND OF THE INVENTION

This invention relates to a system for monitoring the relative proximity between aircraft within a given area, and more particularly to the provision of visual indication to operators of individual aircraft of the proximity of other aircraft, in order to avoid mid-air collision.

Ever-increasing air traffic congestion, especially in the vicinity of air traffic control areas in large metropolitan regions, has led to increasing concern over the danger of in-flight collision. It is well recognized that in poor visibility conditions, i.e., in the presence of clouds, fog, haze or the like, it is difficult if not impossible to observe other aircraft in one's vicinity. However, even with optimum visibility conditions, one may not be aware of the presence of other aircraft in potentially dangerous locations, because of both the large number of aircraft visible and the high degree of concentration required for other matters when entering a high-density air traffic area.

It has heretofore been the exclusive province of air traffic controllers to "take command" in such high-volume air traffic areas, leaving little discretion to the individual aircraft operators, and hence shifting the responsibility for avoiding collision. Nevertheless, discretion is still vested in individual operators to the extent necessary to avoid imminent danger.

However, with ever-increasing air traffic congestion, errors or omissions are possible on the part of the controller, not to mention the possibility of lack of complete clarity in communications between the controller and the aircraft operator. For example, although the controller's normal function is to decide upon and indicate courses and altitudes to the aircraft in his control area, on occasion he may be required to give oral warning to two or more aircraft which have strayed into dangerous proximity to one another. It is, perhaps, in this latter case that the danger of misinterpretation of these communications becomes most significant. One of the involved aircraft operators may misunderstand or misinterpret the warning, e.g., by continuing on his course in the belief that he has identified and avoided the aircraft in respect to which the warning was given, when in fact the danger still exists.

Various solutions have been proposed to some of the foregoing problems, however, the solutions heretofore proposed have been difficult to implement or have given rise to yet other problems. One such proposal has been to provide various alarm buzzers or other such indications to the pilots of aircraft in time to take evasive action. Unfortunately, however, in a high-traffic area, it is most difficult to set such devices so as to give adequate warning, while at the same time avoiding constant disturbance by sounding of the alarm mechanisms in view of the normal close proximity of aircraft in such areas. Additionally, the demands for attention of the pilot of a modern aircraft are quite significant already, without requiring attention to yet further alarms or the like. As a further matter, many of such systems exhibit great disadvantage in their relative complexity and expense. In this regard, these systems generally require all aircraft to be similarly equipped with such complex and expensive equipment in order for the system to function adequately, yet in view of the expense of such systems, many aircraft would not be so equipped.

Accordingly, it is believed that significant shortcomings of the prior art are the complexity and expense of proposed systems; the failure of such proposals to make use of already available techniques and systems to the maximum extent possible, and the probability that many operators of private aircraft would not purchase the expensive apparatus required for the workability of the proposed systems. In high-traffic areas, such systems cannot work to the advantage of commercial aviation, if private, non-commercial aircraft are not included within the system automatically, at least to the extent of being observable in some form.

OBJECTS AND SUMMARY OF THE INVENTION

Accordingly, it is a general object of the present invention to provide a new and improved aircraft proximity monitoring system.

A more specific object is to provide an apparatus and a method in accordance with the foregoing object which provides an aircraft pilot with an observable indication of the locations of other aircraft, relative to the location of his aircraft.

A related object is to provide an apparatus and method in accordance with the foregoing objects which makes maximum use of existing and proven techniques and apparatus, and requires but a minimum of additional equipment to operate.

Another related object is to provide a method and apparatus in accordance with the foregoing objects which is relatively simple and low cost and yet highly reliable in operation.

Briefly, in accordance with the foregoing objects, a method for monitoring aircraft proximity comprises the steps of continuously and repeatedly developing and transmitting signals corresponding to the positions relative to a first location of aircraft within a predetermined range of said first location, receiving said transmitted signals at a given aircraft and transposing the signals corresponding to the positions of the others of said aircraft to said second signals corresponding to the positions of said other aircraft relative to the location of said given aircraft and producing an observable indication of the positions of said other aircraft relative to the location of said given aircraft.

Apparatus for monitoring aircraft proximity in accordance with the invention comprises means for continuously and repeatedly deriving and transmitting signal means representative of the speeds and positions relative to a first location of each and every one of a plurality of aircraft within a predetermined range of said first location, means on at least one of said plurality of aircraft within said range of said first location for receiving said signal means, means on said one aircraft for identifying the portion of said signal means corresponding to said one aircraft, means for transposing the signal information of said signal means so as to form second signal means corresponding to the position of others of said plurality of aircraft relative to said one aircraft and means on said one aircraft responsive to said second signal means for aiding in the navigation of said one aircraft with respect to the positions of at least selected ones of said other aircraft relative to said one aircraft.

Other objects, features and advantages of the invention will become more readily apparent upon consideration of the following detailed description of the illustrated embodiment, taken together with the accompanying drawings wherein.

DETAILED DESCRIPTION OF THE ILLUSTRATED EMBODIMENT

Figure 1:
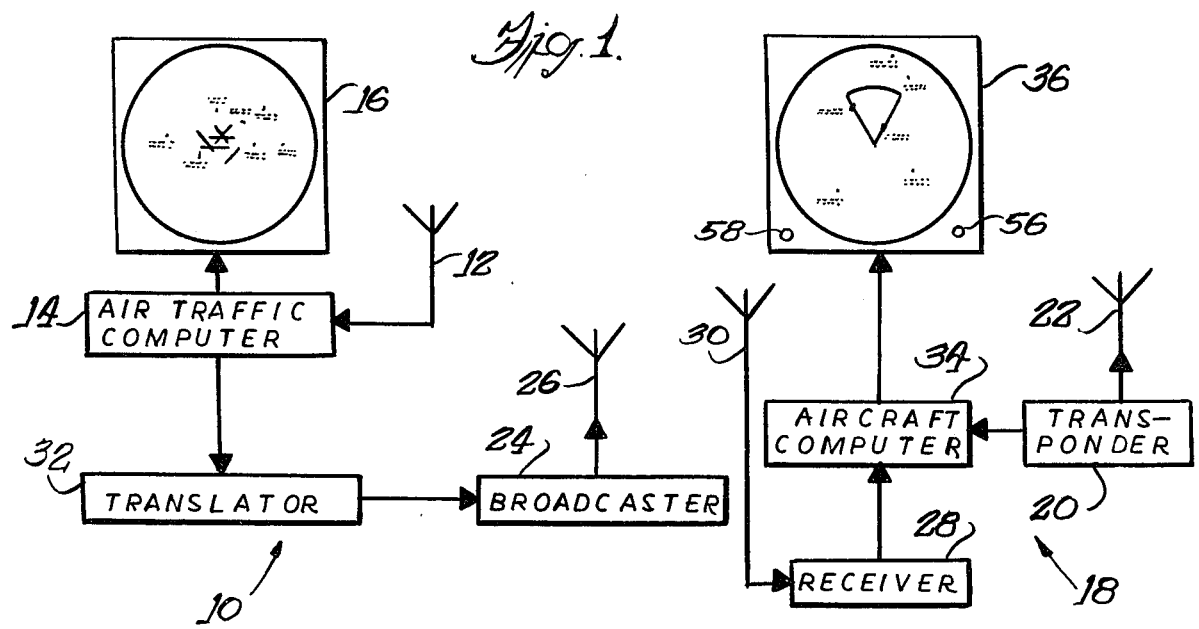
FIG. 1, illustrates, in block diagrammatic form, an apparatus in accordance with the present invention.

Referring now to the drawings, and initially to FIG. 1, the aircraft proximity monitoring system apparatus according to the invention is illustrated in block diagrammatic form. Advantageously, the apparatus makes use of proven and reliable existing equipment at an air traffic control facility (ATC), as designated generally by the reference numeral 10.

Conventionally, the air traffic control facility includes a radar antenna 12 which feeds an air traffic computer 14. The signals received by air traffic computer 14 from the radar unit 12 generally comprise a representation of the relative locations, on an ongoing basis, of aircraft within the air traffic control area, which is generally defined as that area within a predetermined range of the radar antenna 12. The air traffic computer 14 is conventionally arranged and programmed so as to correlate all of the incoming information from the radar "sweep" of the air traffic control area, to provide useful information for visual display on a cathode ray tube (CRT) display screen 16. In practice, a typical facility may contain a number of such screens 16, for use by several air traffic control personnel in handling the volume of traffic in the area.

Briefly, airborne equipment designated generally by the reference numeral 18 conventionally includes a transponder unit 20. This transponder 20 broadcasts or emits a signal by way of an antenna 22, which signal is representative of the identity of that particular aircraft. Additionally, many such transponders 20 are capable of broadcasting signal information corresponding to the altitude of the aircraft. This information is also received at the antenna 12 of the air traffic computer 14, and manipulated by the air traffic computer 14 in suitable fashion for display on the CRT screen 16 together with the position information relating to each aircraft. The air traffic facility 10 also includes a conventional broadcast unit 24 for handling oral communications as required between the air traffic controller and the pilots of aircraft in the air traffic control area. This broadcaster or broadcast unit 24 includes a suitable antenna 26. This oral communication is facilitated in the aircraft 18 by provision of a conventional radio receiver unit 28 and associated antenna 30.

Departing from convention, the apparatus of this invention contemplates the addition of a translator unit 32 interposed between the air traffic computer 14 and the broadcaster unit 24 of the air traffic control facility 10. In accordance with the principals of the invention, the translator 32 cooperates with air traffic computer 14 to convert the display seen by the air traffic controller on the CRT display unit 16 into a suitable form for transmission to the aircraft in the air traffic control area by way of broadcaster 24 and antenna 26. Advantageously, therefore, the pilot of each aircraft in the air traffic control area may receive essentially the same air traffic information as is available at the air traffic control center. Moreover, this information is available to the pilot without equipping the aircraft with an expensive and complex radar unit such as the radar 12 or air traffic computer such as the air traffic computer 14, which are already provided on the ATC 10.

In order to make use of this information from the ATC 10, the apparatus of the invention includes an on-board aircraft computer 34 and a suitable display such as a CRT display screen 36, so as to display conveniently the air traffic information in a form useful to the pilot of each aircraft 18 in the air traffic control area.

As will be more fully described hereinbelow, the aircraft computer 34, in accordance with the principles of the invention, transforms the air traffic information to an "egocentric" display for purposes of the on-board CRT 36. By this is meant that the air traffic as viewed by the pilot of the aircraft 18 is displayed in its relation to his position, rather than its position relative to the antenna 12 of the air traffic control facility 10. Briefly, the aircraft computer 34 transposes or transforms the information from a three-dimensional grid coordinate system centered at the ATC 10 to a three-dimensional grid coordinate system centered at the aircraft 18. The information regarding the identity of the aircraft 18 developed at transponder 20 is also fed to aircraft computer 34, for use in this transposition operation.

Figure 2:
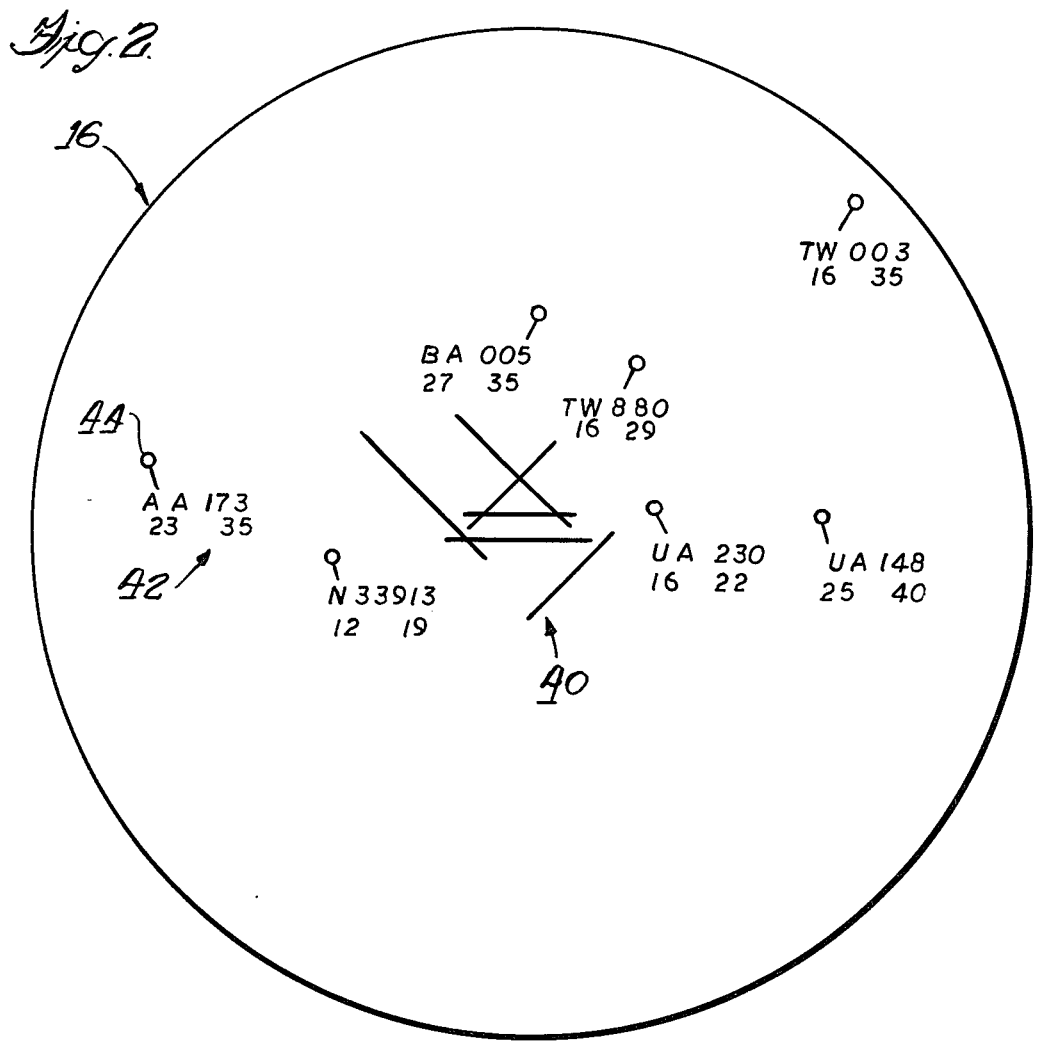
FIG. 2 illustrates a typical air traffic control center display console screen.

Reference is next invited to FIG. 2, wherein a typical or exemplary CRT display screen 16 as viewed by an air traffic controller at the ATC 10 is shown. The display screen 16, in accordance with conventional practice, is generally circular, corresponding generally with the area covered by or chosen effective range of the associated radar unit 12. The air traffic computer 14 converts information received from the radar 12 and from the transponder 20 of each aircraft in the controlled area to a visual display showing the position of each aircraft in the controlled area. The symbols displayed represent the identity of each aircraft, its position, its speed and its altitude.

Briefly, the position of each aircraft is determined on an ongoing basis from successive readings taken from the radar unit 12. It will be apparent that the speed of each aircraft can be readily computed from ongoing, successive readings of its position as against a running time base. The remaining information, viz., the identity of the aircraft and its altitude, are both obtained from the signals emitted by each aircraft's transponder unit 20.

Conventionally, the display 16 includes a representation of the focus of the air traffic control area, which generally is the runway configuration of the associated air field or airport facility, and is designated generally by reference numeral 40. This representation is normally etched or otherwise permanently affixed to a central portion of the display screen 16. A symbolic representation of the position, the identity, the speed and the altitude of each aircraft in the controlled area is displayed, as generally shown on dislay screen 16 of FIG. 2, utilizing alpha-numeric symbols.

Referring to the central left-hand portion of FIG. 2, one such aircraft is displayed as designated generally by reference numeral 42. Briefly, a "dot" 44 indicates the position of the aircraft while the alpha numeric symbol AA 173 indicates that this dot represents the position of American Airlines flight number 173. A numeric 23 under the designation AA indicates the speed of that aircraft, in tens of knots, as 230 knots, and a remaining numeric 35 indicates the altitude of that aircraft, in hundreds of feet, as 3500 feet. Similar display characters at various other locations on the display screen 16 of FIG. 2 indicate the positions, identities, speeds and altitudes of the following aircraft: British Airways flight 005, TWA flight 003, TWA flight 880, United Airlines flight 230, United Airlines flight 148 and a private aircraft designated N33913.

Figure 3:
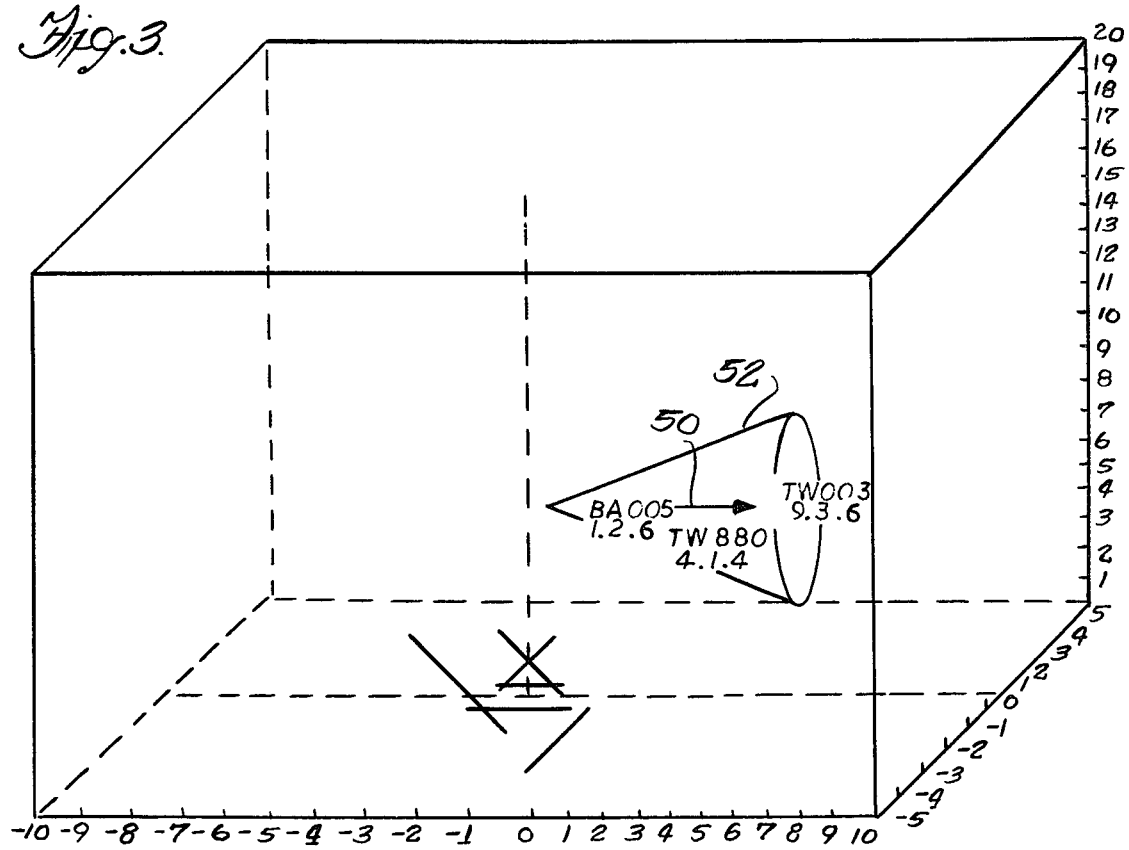
FIG. 3 is a three-dimensional graphical representation of one mode of the operation of the apparatus and method of the invention; and, FIG. 4 illustrates an exemplary airborne visual display screen, forming a part of the apparatus of the invention.

Referring now to FIG. 3, a three-dimensional grid coordinate system is shown, centered at the ATC 10, for purposes of illustrating further features of the operation of the present invention. Three of the aircraft in the controlled area as displayed on the screen 16 of FIG. 2 are here illustrated: British Airways flight 005 (BA 005), TWA flight 880 (TW 880 ) and TWA flight 003 (TW 003).

Briefly, working on the coordinate system of FIG. 3, the aircraft BA 005 is located at coordinates 1, 2, 6 with respect to the three dimensional rectangular coordinates of FIG. 3. Similarly, the aircraft TW 880 is located at coordinates 4, 1, 4 and flight TW 003 is located at coordinates 9, 3, 6. Taking aircraft BA 005 as aircraft 18 equipped with the apparatus of the invention as shown in FIG. 1, it will become readily apparent that conversion of the coordinates of the aircraft TW 880 and TW 003 to a system centered around aircraft 18 is a relatively simple matter. Accordingly, display of these aircraft positions relative to the aircraft 18 is correspondingly relatively simple to achieve by means of the aircraft computer 34, in accordance with this invention. Theoretically, if aircraft BA 005 coordinates are converted to 0, 0, 0, it will be apparent that similar conversion of coordinates of the aircraft TW 003 and TW 880 requires only a corresponding matrix manipulation of the coordinates of the remaining aircraft, with respect to the air traffic control center 10, to accomplish the conversion of the display to a coodinate system centering at the aircraft BA 005.

Taking the aircraft BA 005 as the aircraft 18 of FIG. 1, and assuming its direction of travel is generally as indicated by the arrow 50, it will become apparent that of the aircraft shown in the air traffic control display 16 of FIG. 2, TW 003 and TW 880 are those of most concern to BA 006 on its present course of travel. These two aircraft might be said to come within a range or area of concern with respect to the aircraft BA 005 in this case, the volume within range being here indicated by a cone 52, which is hereinafter referred to as a "cone of concern".

Advantageously, the on-board aircraft computer 34 is capable of manipulating the information input thereto to extrapolate or devise such a cone of concern 52 for the aircraft BA 005. The provision of such a cone of concern 52 is used to distinguish aircraft within this critical range of BA 005 on the display 36 thereby calling the pilot's particular attention to these aircraft.

Figure 4:
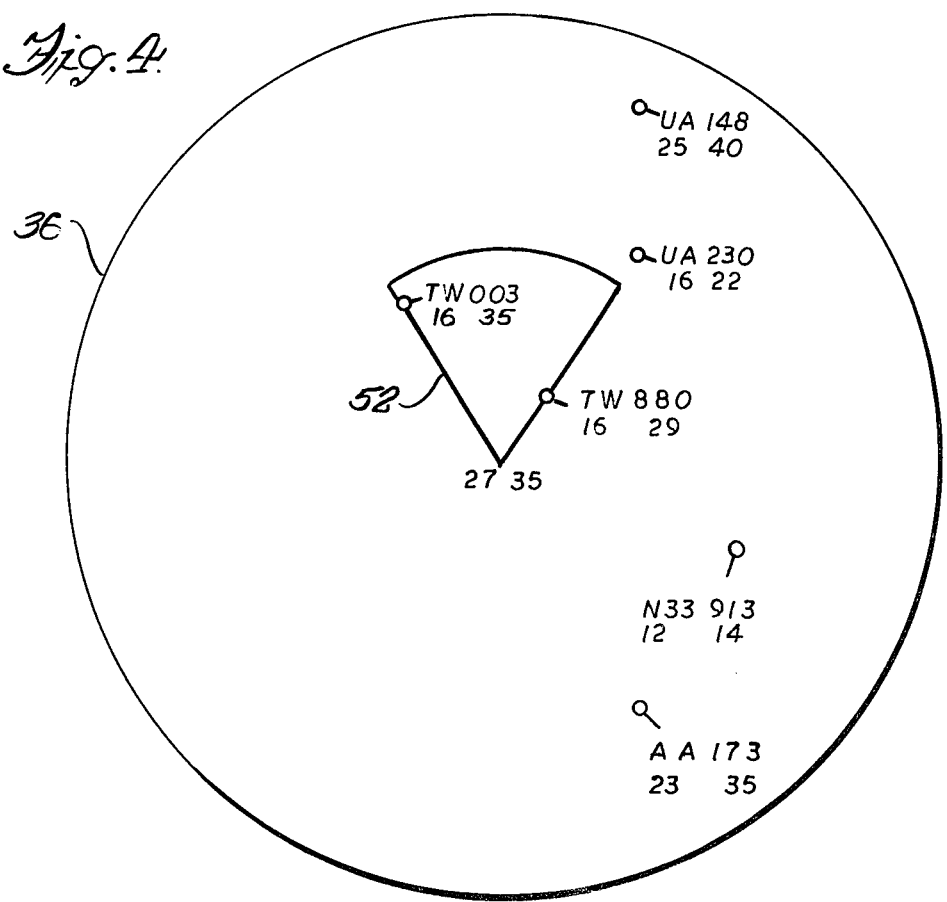

Referring now also to FIG. 4, the display screen 36 for aircraft 18 is shown in greater detail. The display screen 36 now displays the position, together with the alpha numeric display characters identifying each aircraft, its speed and its position, all with respect to the aircraft 18 (BA 005). It will be appreciated that these alpha numeric indications designating or identifying each aircraft, as well as the numerals indicating its speed and its altitude, remain unchanged from that on the concurrent display at air traffic display screen 16, as viewed in FIG. 2. The relative positions of these aircraft have all now been altered, however, to reflect their positions relative to aircraft 18 (BA 005). The "cone of concern" 52 is again illustrated, for purposes of description only, on display screen 36 in FIG. 4. In its preferred form, the invention would not display this cone as such, but would rather provide some visual emphasis to aircraft falling within this area of the screen. This function is accomplished by the computer 34 which essentially compares the positions of aircraft with a preselected "cone of concern". For example, aircraft entering this "cone of concern" might be emphasized by means of lighting their "dots" and alpha numeric display characters more brightly than those of aircraft outside of this area on the screen 36.

In a further preferred embodiment, the cone of concern 52 is readily manipulated or changed by the pilot of the aircraft 18. In this regard, suitable controls, designated generally 56 (see FIG. 1), are provided for, in essence, "yawing" and "pitching" the cone of concern. Advantageously, then the pilot may, for example, monitor the traffic in the general direction of an anticipated change in course, before changing his course.

In accordance with an important feature of the invention, the described system exhibits an additional capability. Namely, the controller may indicate a specific aircraft to a pilot by using a "reverse ident" procedure. Briefly, the controller would actuate a suitable control associated with the air traffic computer 14 to transmit a signal to which the aircraft computer 34 would respond by "highlighting" or flashing the "dot" and/or alphanumeric display of one of the aircraft on the pilot's screen 36. Such a feature is especially useful, for example, to specifically identify a particular aircraft in a situation where a precise verbal identification would be difficult or impossible. For example, with reference to FIG. 2, a controller might warn the pilot of BA005—"traffic at 11 o'clock your altitude, TWA", referring to TW003. Since TW880 is also a TWA aircraft and is roughly at 11 o'clock with respect to BA005 and fairly close in altitude the pilot of BA005 might believe that the controller is referring to TW880, thus failing to apprehend the dangerous proximity of TW003. However, by using the "reverse ident." feature of the invention, the controller may not only tell the pilot about TW003, but also "show" the pilot, by flashing the symbol "TW003" on the pilot's display screen 36.

It will be recognized that many additional improvements may be provided in conjunction with the present invention, by the simple expedient of suitable programming of the aircraft computer 34. Since all of the information available at the air traffic control center 10 is equally available to the aircraft 18 in accordance with the novel principles of the present invention, other suitable indications and/or displays may be provided. For example, additional alarm or warning indications may be provided, as may suggest themselves to those skilled inn the art upon reading the foregoing descriptions. Such modifications are also considered within the scope of the present invention, insofar as they emanate from the same inventive principles as set forth in the appended claims.

It is believed that many advantages of the present invention, as described with reference to the illustrated embodiments, will now become more readily apparent. Briefly, the invention includes a method of air traffic control and proximity warning in which information already available to relatively sophisticated and expensive air traffic control centers may be made available to individual aircraft with but a minimum of additional equipment and/or expense. Accordingly, aircraft may readily use the invention without regard for the decision of the owners of other aircraft whether or not to provide any additional on-board equipment, as all of the information necessary emanates from an existing air traffic control center. All that is required for an aircraft to take advantage of this information is a suitable radio receiver, an on-board aircraft computer and a suitable CRT or display screen for providing an easily readable visual display of the air traffic as centered about that aircraft.

To facilitate a fully understanding of the operation of the present invention, an exemplary computer program is set forth on the following pages.

While the invention has been described with reference to preferred embodiments, it is not limited thereto. On the contrary, the invention includes such alternatives, changes and modifications as may become apparent to those skilled in the art, insofar as such alternatives, changes and modifications fall within the spirit and scope of the appended claims.

```
GROUND COMPUTER ALGORITHM

ASSUMPTIONS:
1) FUNCTION GET_TARGET RETURNS THE FOLLOWING ATTRIBUTES OF THE NEXT
TARGET ON THE CONTROLLING FACILITIES RADAR:
     A) ANGLE OF THE TARGET FROM NORTH IN DEGREES
     B) SLANT DISTANCE IN FEET FROM THE RADAR SITE
     C) ELEVATION ANGLE IN DEGREES, (OPTIONAL)
     D) MODE_C PRESSURE ALTITUDE IF EQUIPPED, ELSE -10000
     E) TRANSPONDER CODE IF EQUIPPED, ELSE 9999
     F) ALPHA_NUMERICS ASSOCIATED WITH THIS TRANSPONDER CODE
     G) SPEED IN KNOTS

2) FUNCTION TRANSMIT SEND THE SPECIFIED MESSAGE SEGMENT TO THE RADIO TRANSMITTER
     A) TRANSPONDER_CODE
     B) ASSOCIATED ALPHA_NUMERICS
     C) NSAXIS, UNITS ALONG THE CONTROLLING FACILITY NORTH/SOUTH AXIS
     D) EWAXIS, UNITS ALONG THE CONTROLLING FACILITY EAST/WEST AXIS
     E) UPAXIS, UNITS ALONG THE ALTITUDE AXIS
     F) SPEED, IN KNOTS
NEW_SCAN: TRANSMIT("SEQUENCE_START");
NEXT_POINT: GET_TARGET(ANGLE,SLANT_DISTANCE,ELEVATION_ANGLE,PRESSURE_ALTITUDE,
     TRANSPONDER_CODE,ALPHA_NUMERICS,SPEED);
IF NO_MORE THEN
BEGIN
     TRANSMIT ("SEQUENCE_END");
     GO TO NEW_SCAN;
END;
IF PRESSURE_ALTITUDE IS NOT EQUAL -10000 THEN
BEGIN
     ALTITUDE=PRESURE_ALTITUDE;
     GROUND_DISTANCE=SQRT(SLANT_DISTANCE**2-PRESSURE_ALTITUDE**2);
END
ELSE
     ALTITUDE=SLANT_DISTANCE*SINE(ELEVATION_ANGLE);
     GROUND_DISTANCE=DISTANCE*COSINE(ELEVATION_ANGLE);
END;
UPAXIS=ALTITUDE;
IF ANGLE >= 0 AND ANGLE < 90 THEN
BEGIN
     NSAXIS=GROUND_DISTANCE*COSINE(ANGLE);
     EWAXIS=GROUND_DISTANCE*SINE(ANGLE);
END;
IF ANGLE => 90 AND ANGLE < 180 THEN
BEGIN
     NSAXIS=-(GROUND_DISTANCE*COSINE(180-ANGLE));
     EWAXIS=GROUND_DISTANCE*SINE(180-ANGLE);
END;
IF ANGLE >= 180 AND ANGLE < 270 THEN
BEGIN
     NSAXIS=-(GROUND_DISTANCE*COSINE(ANGLE-180));
     EWAXIS=-(GROUND_DISTANCE*SINE(ANGLE-180));
END;
IF ANGLE >= 270 AND ANGLE < 360 THEN
BEGIN
     NSAXIS=GROUND_DISTANCE*COSINE(360-ANGLE);
     EWAXIS=-(GROUND_DISTANCE*SINE(360-ANGLE));
END;
TRANSMIT(TRANSPONDER_CODE,ALPHA_NUMERICS,NSAXIS,EWAXIS,UPAXIS,SPEED);
GO TO NEXT_POINT;
```

AIRBORNE COMPUTER ALGORITHM

ASSUMPTIONS:
1) FUNCTION RECEIVE RETURNS THE MESSAGE SEGMENT FOR THE NEXT TARGET FROM THE
RADIO RECEIVER.
    A) TRANSPONDER_CODE IF EQUIPPED, ELSE 9999
    B) ALPHA_NUMERICS ASSOCIATED WITH THIS TRANSPONDER_CODE
    C) NSAXIS, UNITS ALONG THE CONTROLLING FACILITY NORTH/SOUTH AXIS
    D) EWAXIS, UNITS ALONG THE CONTROLLING FACILITY EAST/WEST AXIS
    E) UPAXIS, UNITS ALONG THE ALTITUDE AXIS
    F) SPEED IN KNOTS

2) FUNCTION MY_CODE WHICH RETURNS THE RECEIVING AIRCRAFTS OWN
TRANSPONDER CODE.

3) FUNCTION CONE WHICH RETURNS THE PARAMETERS FOR THE CURRENTLY DEFINED
CONE OF CONCERN
    A) DEPTH OF THE CONE
    B) SPREAD_ANGLE OF THE CONE
    C) YAW_ANGLE FROM THE DIRECTION OF MOVEMENT OF THE AIRCRAFT
    D) PITCH_ANGLE FROM LEVEL

4) FUNCTION DISPLAY DISPLAYS ON THE COCKPIT CRT:
    A) XAXIS, UNITS ALONG THE AHEAD/BEHIND AXIS
    B) YAXIS, UNITS ALONG THE LEFT/RIGHT AXIS
    C) ALTITUDE
    D) SPEED
    E) ALPHA_NUMERICS
    F) HIGH_LIGHT_CODE, 0 IF NOT IN CONE OF CONCERN, 1 IF IN CONE OF CONCERN

```
BEGIN
ARRAY TRANSPONDER_CODE(100),ALPHA_NUMERICS(100),NSAXIS(100),EWAXIS(100),
    UPAXIS(100),SPEED(100);
NEW_SCAN: RECEIVE("SEQUENCE_START");
MY_CODE(MY_TRANSPONDER_CODE);
CONE(DEPTH,SPREAD_ANGLE,YAW_ANGLE,PITCH_ANGLE);
I=1;
NEXT_POINT: RECEIVE(TRANSPONDER_CODE(I),ALPHA_NUMERICS(I),NSAXIS(I),
    EWAXIS(I),UPAXIS(I),SPEED(I));
IF NOT "SEQUENCE_END" THEN
BEGIN
    I=I-1;
    GO TO HAVE_POINTS;
END;
IF TRANSPONDER_CODE(I)=MY_TRANSPONDER_CODE THEN
BEGIN
    MY_PTR=I;
    OLDNS=MYNS;
    OLDEW=MYEW;
    MYNS=NSAXIS(I);
    MYEW=EWAXIS(I);
END;
I=I+1;
GO TO NEXT_POINT;
HAVE_POINTS: OLDNS=OLDNS-MYNS;
OLDEW=OLDEW-MYEW;
MYNS=0;
MYEW=0;
FOR J = 1 TO I
BEGIN
    NSAXIS(J)=NSAXIS(J)-NSAXIS(MY_PTR);
    EWAXIS(J)=EWAXIS(J)-EWAXIS(MY_PTR);
END;
IF OLDNS >= 0 AND OLDEW >= 0 THEN
    ROTATION_ANGLE=180+ARCTANGENT(OLDEW/OLDNS);
IF OLDNS < 0 AND OLDEW >= 0 THEN
    ROTATION_ANGLE=360-ARCTANGENT(OLDEW/-OLDNS);
IF OLDNS < 0 AND OLDEW < 0 THEN
    ROTATION_ANGLE = ARCTANGENT(-OLDEW/-OLDNS);
IF OLDNS >= 0 AND OLDEW < 0 THEN
    ROTATION_ANGLE=180-ARCTAGENT(-OLDEW/OLDNS);
K=INT(ROTATION_ANGLE/90);
FOR L = 1 TO K
```

```
BEGIN
    FOR J = 1 TO I
    BEGIN
        IF NSAXIS(J) >= 0 AND EWAXIS(J) >= 0 THEN
        BEGIN
            EWAXIS(J)=-EWAXIS(J);
            GO TO SHIFT_END;
        END;
        IF NSAXIS(J) < 0 AND EWAIS(J) >= 0 THEN
        BEGIN
            NSAXIS(J)=-NSAXIS(J);
            GO TO SHIFT_END;
        END;
        IF NSAXIS(J) < 0 AND EWAXIS(J) < 0 THEN
        BEGIN
            EWAXIS(J)=-EWAXIS(J);
            GO TO SHIFT_END;
        END;
        IF NSAXIS(J) >= 0 AND EWAXIS(J) < 0 THEN
        BEGIN
            NSAXIS(J)=-NSAXIS(J);
            GO TO SHIFT_END;
        END;
    SHIFT_END: END;
END;
FOR J = 1 TO I
BEGIN
    IF NSAXIS(J) >= 0 AND EWAXIS(J) >= THEN
    BEGIN
        PRESENT_ANGLE=90-ARCTANGENT(NSAXIS(J)/EWAXIS(J));
        HYPO=SQRT(NSAXIS(J)**2+EWAXIS(J)**2);
        NEW_ANGLE=PRESENT_ANGLE-ROTATION_ANGLE;
     YAXIS=HYPO/SINE(NEW_ANGLE);
     XAXIS=HYPO/COSINE(NEW_ANGLE);
END;
IF NSAXIS(J) < 0 AND EWAXIS(J) >= THEN
BEGIN
    PRESENT_ANGLE=180-ARCTANGENT(NSAXIS(J)/EWAXIS(J));
    HYPO=SQRT(NSAXIS(J)**2+EWAXIS(J)**2);
    NEW_ANGLE=PRESENT_ANGLE-ROTATION_ANGLE;
    YAXIS=-HYPO/SINE(NEW_ANGLE);
    XAXIS=HYPO/COSINE(NEW_ANGLE);
END;
IF NSAXIS(J) < 0 AND EWAXIS(J) < THEN
BEGIN
    PRESENT_ANGLE=270-ARCTANGENT(NSAXIS(J)/EWAXIS(J));
    HYPO=SQRT(NSAXIS(J)**2+EWAXIS(J)**2);
    NEW_ANGLE=PRESENT_ANGLE-ROTATION_ANGLE;
    YAXIS=-HYPO/SINE(NEW_ANGLE);
    XAXIS=-HYPO/COSINE(NEW_ANGLE);
END;
IF NSAXIS(J) >= 0 AND EWAXIS(J) < THEN
BEGIN
    PRESENT_ANGLE=360-ARCTANGENT(NSAXIS(J)/EWAXIS(J));
    HYPO=SQRT(NSAXIS(J)**2+EWAXIS(J)**2);
    NEW_ANGLE=PRESENT_ANGLE-ROTATION_ANGLE;
    YAXIS=HYPO/SINE(NEW_ANGLE);
    XAXIS=-HYPO/COSINE(NEW_ANGLE);
END;
HIGH_LIGHT_CODE=0;
IF YAXIS < 0 THEN
    GO TO DO_DISPLAY;
RANGE=SQRT(SQRT(XAXIS**2+YAXIS**2)+UPAXIS**2);
IF RANGE > DEPTH THEN
    GO TO DO_DISPLAY;
LEFT=YAW_ANGLE-(SPREAD_ANGLE/2);
RIGHT=YAW_ANGLE+(SPREAD_ANGLE/2);
TOP=PITCH_ANGLE+(SPREAD_ANGLE/2);
BOTTOM=PITCH_ANGLE-(SPREAD_ANGLE/2);
```

```
HORIZ_ANGLE=ABSOLUTE(ARCTANGENT(XAXIS/YAXIS);
VERT_ANGLE=ABSOLUTE(ARCTANGENT((UPAXIS(MY_PTR)_UPAXIS(J))/RANGE));
IF HORIZ_ANGLE < LEFT OR HORIZ_ANGLE > RIGHT THEN
    GO TO DO_DISPLAY;
IF VERT_ANGLE < BOTTOM OR VERT_ANGLE > TOP THEN
    GO TO DO_DISPLAY;
HIGH_LIGHT_CODE = 1;
DO_DISPLAY: DISPLAY(XAXIS,YAXIS,UPAXIS(J),SPEED(J),
    ALPHA_NUMERICS(J),HIGH_LIGHT_CODE);
END;
GO TO NEW_SCAN;
```

The invention is claimed as follows:

1. An aircraft proximity monitoring system comprising: ground-based means for continuously and repeatedly deriving and transmitting signal information representative of the speeds and positions relative to a first location of each and every one of a plurality of aircraft within a predetermined range of said first location, means on at least one of said plurality aircraft within said range of said first location for receiving said signal information, means on said one aircraft for identifying the portion of said signal information corresponding to said one aircraft, means for transposing said signal information so as to form second signal information corresponding to the positions of others of said plurality of aircraft relative to the position of said one aircraft and means on said one aircraft responsive to said second signal information for aiding in the navigation of said one aircraft with respect to the positions of at least selected ones of said other aircraft relative to the position of said one aircraft.

2. An aircraft proximity monitoring system according to claim 1 wherein said developing and transmitting means further includes means for developing and transmitting as a portion of first said signal information, information corresponding to the identity of selected ones of said aircraft within said predetermined range.

3. An aircraft proximity monitoring system according to claim 1 or claim 2 wherein said developing and transmitting means further includes means for developing and transmitting as a part of said first signal information, information corresponding to the altitude of selected ones of said aircraft within said predetermined range.

4. An aircraft proximity monitoring system according to claim 3 wherein said developing and transmitting means comprises translator means for cooperating with an air traffic computer and responsive to both ground-based radar and transponders carried by selected aircraft within said predetermined range and wherein said first location comprises an air traffic control center.

5. An aircraft proximity monitoring system according to claim 1 wherein said means for aiding in navigation comprises means for providing an observable indication of the positions of at least selected ones of said other aircraft relative to said one aircraft.

6. An aircraft proximity moitoring system according to claim 5 further including means on said one aircraft for distinguishing portions of said second signal information corresponding to aircraft within a predetermined range of special concern with respect to said one aircraft, and wherein said means for producing an observable indication includes means for distinguishing the portion of the observable indication corresponding to said portions of said second signal information distinguished.

7. An aircraft proximity monitoring system according to claim 6 wherein said means for producing an observable indication comprises a CRT display and wherein said range of concern comprises a predetermined volume having an apical portion located at the position in said CRT display representing said one aircraft.

8. An aircraft proximity monitoring system according to claim 7 wherein said volume comprises a cone.

9. An aircraft proximity monitoring system according to claim 7 wherein said receiving means and said transposing means on said aircraft include an aircraft computer system including means for selectively rotating said volume of concern about said apical portion.

10. An aircraft proximity monitoring system according to claim 1 or claim 9 wherein said one aircraft carries a transponder for producing signal information corresponding to the identity of said one aircraft and wherein said transposing means includes means for correlating said signal information from said transponder with said signal information from said transmitting means for producing said observable indication of other aircraft within said given range relative to said given aircraft.

11. An aircraft proximity monitoring system according to claim 7 wherein said observable indication producing means includes means for emphasizing the representations on said CRT aircraft within said volume of concern.

12. An aircraft proximity monitoring system according to claim 7 wherein said observable indication producing means includes means for deemphasing the representations on said CRT on aircraft not within said volume of concern.

13. An aircraft proximity monitoring system according to claim 6 wherein said observable indication producing means further includes means for producing a separate indication in response to said distinguishing means and corresponding to other aircraft within said range of concern.

14. An aircraft proximity monitoring system according to claim 1 wherein said last-mentioned means further includes means for providing an observable indication corresponding to the speeds of said other aircraft.

15. An aircraft promixity monitoring method comprising the steps of: continuously and repeatedly developing and transmitting signals at a ground station corresponding to the positions relative to a first location of each and every aircraft within a predetermined range of said first location, receiving said transmitted signals at a given aircraft and transposing the signals corresponding to the positions of the others of said aircraft to second signals corresponding to the positions of said other aircraft relative to the location of said given aircraft and producing an observable indication of the positions of said other aircraft relative to said location of said given aircraft.

16. An aircraft proximity monitoring method according to claim 15 wherein the step of developing and transmitting further includes developing and transmitting signals corresponding to the identity of each of said aircraft within said predetermined range, wherein the step of receiving includes receiving said signals corresponding to the identity of said aircraft and wherein the step of producing an observable indication includes producing an observable indication of said identity.

17. An aircraft proximity monitoring method according to claim 15 or claim 16 wherein the step of developing and transmitting includes developing and transmitting signals corresponding to the altitudes of each of said aircraft within said predetermined range, wherein the step of receiving includes receiving said signals corresponding to altitudes and the step of producing an observable indication includes producing an observable indication corresponding to said altitudes.

18. An aircraft proximity monitoring method according to claim 15 wherein the step of producing an observable indication further includes establishing a range of concern relative to said location of said given aircraft and differentiating the observable indications within said range of concern from those observable indications without said range of concern.

19. An aircraft proximity monitoring system comprising: ground-based means for continuously and repeatedly deriving and transmitting signal information representative of the speeds and positions relative to the location of an air traffic control center of each and every one of a plurality of aircraft within a predetermined range of said location, means on at least one of said plurality aircraft within said range of said location for receiving said signal information, means on said one aircraft for identifying the portion of said first signal information corresponding to said one aircraft, means for transposing said signal information so as to form second signal information corresponding to the positions of others of said plurality of aircraft relative to said one aircraft, means on said one aircraft responsive to said second signal information for producing an observable indication of the positions of selected ones of said other aircraft relative to said one aircraft, means accessible to an air traffic controller at said air traffic control center for transmitting further signal information corresponding to a particular one of said aircraft and additional means in said indication producing means for producing a separately identifiable observable indication particularly identifying the position of said particular one of said aircraft with respect to said one aircraft.

* * * * *